United States Patent [19]

Duchon et al.

[11] Patent Number: 5,585,823
[45] Date of Patent: Dec. 17, 1996

[54] MULTI-STATE ONE-BUTTON COMPUTER POINTING DEVICE

[75] Inventors: Brent Duchon, San Jose; Anh Nguyen, Fremont; James Baldwin, Mountain View, all of Calif.

[73] Assignee: Apple Computer, Inc., Cupertino, Calif.

[21] Appl. No.: 366,562

[22] Filed: Dec. 30, 1994

[51] Int. Cl.[6] ........................................ G09G 5/08
[52] U.S. Cl. ............................ 345/163; 345/157
[58] Field of Search ........................ 345/156, 157, 345/163–166

[56] References Cited

U.S. PATENT DOCUMENTS

| | | | |
|---|---|---|---|
| 4,464,652 | 8/1984 | Lapson et al. | 345/165 |
| 4,654,647 | 3/1987 | Wedam | 345/157 X |
| 5,510,810 | 4/1996 | Nishijima et al. | 345/156 |

*Primary Examiner*—Ulysses Weldon
*Attorney, Agent, or Firm*—Hickman Beyer & Weaver

[57] ABSTRACT

A multi-state, one-button computer mouse includes a housing movable over a reference surface, a tracking mechanism coupled to the housing to provide positional coordinates relative to the reference surface, a single button, and a switch mechanism coupled to the button. The single button is movable between a base position, a first button position, and a second button position by a force exerted on the button. The button is biased to the base position in absence of the force. The switch mechanism is coupled to the button such that it activates a first switch at the first button position and a second switch at the second button position. A computer system with the pointing device includes a processing unit, a visual display, a pointing device as described above, and a computer implemented process for indicating on the visual display when the button of the pointing device is in a locked button mode. A computer-implemented process for processing pointer data includes intercepting pointer data entered into the processing unit of the computer system, determining whether the pointer data includes locked button data, entering a locked button state if it is included, processing the pointer data in a pointer data handler, and changing a cursor image to be displayed on the visual display to indicate that the button is in the locked button state.

20 Claims, 9 Drawing Sheets

MULTI-STATE ONE-BUTTON COMPUTER POINTING DEVICE

BACKGROUND OF THE INVENTION

This invention relates generally to computer pointing devices, and more particularly to one-button mice for computer systems.

Computer systems having graphical user interfaces (GUI) are typically provided with some form of pointing device which controls a cursor on the computer screen. This cursor can be used to point to various objects on the screen, such as windows, word objects, graphical objects, etc. Once a desired object has been pointed to, a button, switch, gesture, or other input mechanism is used to cause the computer system to perform an act upon the selected object.

One of the most common types of pointing devices is the computer mouse. Other types of pointing devices can be functionally equivalent to the mouse. For example, track balls, slide-bars (such as used on some Hewlett Packard computer systems), joy sticks, input tablets, touch screens, etc. can all perform pointing functions. All of these pointing devices have the common denominator of providing input coordinates (typically x,y or "Cartesian" coordinates) related to some reference surface into the computer system to allow the computer system to position the cursor accordingly on the screen.

As mentioned previously, the computer mouse is likely the most common form of such pointing devices. A computer mouse includes a housing movable over a reference surface, and some form of tracking mechanism coupled to the housing to provide positional coordinates relative to the reference surface to the computer system. The tracking mechanism can be of many types including mechanical tracking mechanisms and optical tracking mechanisms. The most common tracking mechanism for mice is the mechanical tracking mechanism in which a ball rolls over the reference surface and two or more sensors detect the rolling of the ball to develop the positional coordinates.

Computer mice are typically provided with one or more buttons so that when the cursor is properly positioned on the screen the object indicted by the cursor acted upon. By providing multiple buttons (e.g., two or more buttons), additional multiple functions can be, perhaps, more easily accomplished with the mouse. For example, one of the multiple buttons can be a simple "click" button, and the other button can be a "lock" button which locks when first pressed by the user, and unlocks when pressed by the user for a second time. This locking button of a multi-button mouse can be very useful in that an object can be selected and manipulated without the user continuously holding down a mouse button.

There is, however, a problem with multi-button mice having a locking button is that there is no visual feedback on the screen to let the user know that the button is in the locked state. Therefore, the user may be trying to use a different button of the mouse, only to find that it does not work because the mouse is already in a locked button mode. It sometimes takes experimentation by the user in pressing the various buttons of the mouse to determine exactly which mode the mouse is in. While this may be a minor annoyance, it detracts from the efficient use of the computer system and may cause some accidental data loss if a user, while experimenting with various buttons of the mouse, accidentally modifies or deletes some data or a file.

Another type of mouse uses only a single button. This is the preferred mouse type to be used with the Macintosh® computer systems of Apple Computer, Inc. One-button mice are simple to use and do not suffer from the ambiguities of multi-button mice. In particular, a user of a Macintosh-style mouse does not have to remember the meaning of the multiple buttons or what state those buttons are in. However, a one-button mouse has the disadvantage of having a more limited number of functions that can be performed by the mouse.

With a Macintosh-style one-button mouse, three basic functions can be performed. A single click of the button will result in the selection of an object, while a rapid double click of the button will cause the activation of the object. For example, a single click on an application program icon will select that application program icon, and a double click on the application program icon will activate the application program. In a third mode, the button is pressed and held down by the user, to put the cursor in a "drag" mode which can drag windows and other objects around the computer screen.

While the current Macintosh-style mouse does not provide for a locked button function, is contemplated that such a function might be desirable. However, the single-button preference for Macintosh-style mice prohibits the use of a separate, locking button.

SUMMARY OF THE INVENTION

The present invention provides a locked button mode for a single-button mouse. In addition, the present invention provides a visual indication the computer screen to indicate when the button is in the locked button mode. In this fashion, the functionality of a one-button mouse has been enhanced, and the confusion that accompanied lockable buttons of prior art multi-button mice has been eliminated.

A computer pointing device with multiple states on a single button in accordance with the present invention includes a housing, a tracking mechanism coupled to the housing to provide positional coordinates along a reference surface, a button, and switch mechanism coupled to button. The button is movable between a base position, a first button position, and second button position by exerting a force on the button. The button is biased to the base position in the absence of force being exerted on the button. The switch mechanism activates a first switch at the first button position and a second switch at the second button position. The second switch can be used to indicate the entry of the mouse into a locked button mode.

A computer system with a pointing device in accordance with the present invention includes a processing unit, a visual display, a pointing device as described above, and a mechanism for indicating on the visual display when pointing device is in the locked button mode. Preferably, this mechanism changes the image of the cursor on the screen to indicate the locked button mode. For example, the cursor can be changed from a pointing arrow to a "fist" to indicate that the button is in the locked button mode.

A method for processing switch inputs to a computer system includes the steps of: (a) entering a known state comprising one of the zero state, a one state, and two state; (b) detecting at least two button positions of a button with a switch mechanism, the switch mechanism activating a first switch at a first button position and activating a second switch at a second button position; and (c) if in the zero state, entering the one state if the second switch is activated, if in the one state entering the two state if neither the first switch nor the second switch are activated, and if in the two state entering the zero state if the first switch is activated. The one state indicates a non-locked button mode and the one state and the two state indicate a locked button mode. Preferably, steps (b) and (c) are repeated in an event loop as new mouse data is received.

A computer implemented process for processing pointer data includes the steps of intercepting pointer data entered into a processing unit of a computer system, determining in the processing unit if the pointer data includes locked button data and entering a locked button state if the pointer includes locked button data, processing the pointer data in a pointer data handler in the processing unit, and changing a cursor image to be displayed on a visual display coupled to the processing unit to indicate the locked button state.

Therefore, the present invention provides a pointing device and a computer implemented process which can be combined in a computer system to implement a locked button function on a one-button mouse. This provides an easy-to-use, intuitive, and functional solution to beforementioned drawbacks of both single-button and multi-button mice of the prior art.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
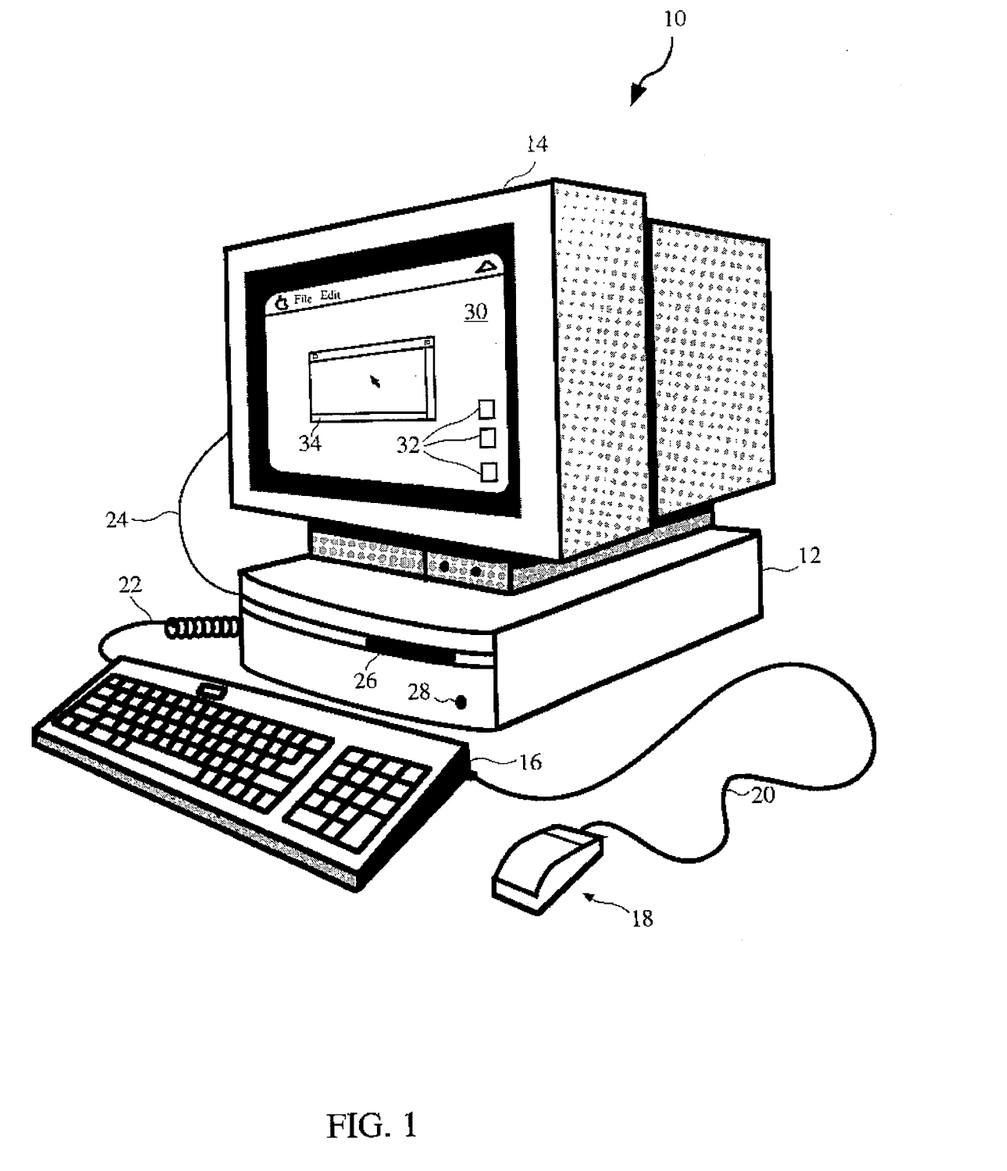
FIG. 1 is a pictorial view of a computer system with a pointing device in accordance with the present invention.

In FIG. 1 a computer system 10 in accordance with the present invention includes a processing unit 12, a visual display 14, a keyboard 16, and a mouse 18. The mouse 18 is coupled to the keyboard 16 by cable 20, the keyboard 16 is coupled to the processing unit 12 by a cable 22, and the visual display 14 is coupled to the processing unit 12 by a cable 24.

The processing unit 12 is preferably a standard, commercially available computer processing unit, such as a Power Macintosh® made by Apple Computer, Inc. of Cupertino, Calif. As well known to those skilled in art, such processing units include a Central Processing Unit (CPU), Random Access Memory (RAM), Read Only Memory (ROM), a "chipset" which provides an interface between the CPU and other portions of the processing unit, a floppy disk drive 26, and an on-off button 28. The design of processing units such as processing unit 12 are well known to those skilled in the art and will not be discussed any further herein.

The visual display 14 is often a Cathode Ray Tube (CRT) display having a screen 30. Alternatively, Liquid Crystal Displays (LCD) are also frequently used, particularly in small, portable computer systems. Various images or objects including icons 32 and windows such as a window 34 can be displayed on the screen 30 to provide a Graphical User Interface (GUI).

The keyboard 16 tends to be one of the primary methods for entering user data into the processing unit 12. With Macintosh computers, the mouse 18 is coupled to a port of the keyboard 16 so that mouse data is sent over cable 20 to the keyboard 16 and from there to over cable 22 to the processing unit 12. However, with other implementations of this invention, the mouse 18 or other pointing device may be coupled directly to the processing unit 12.

Figure 2:
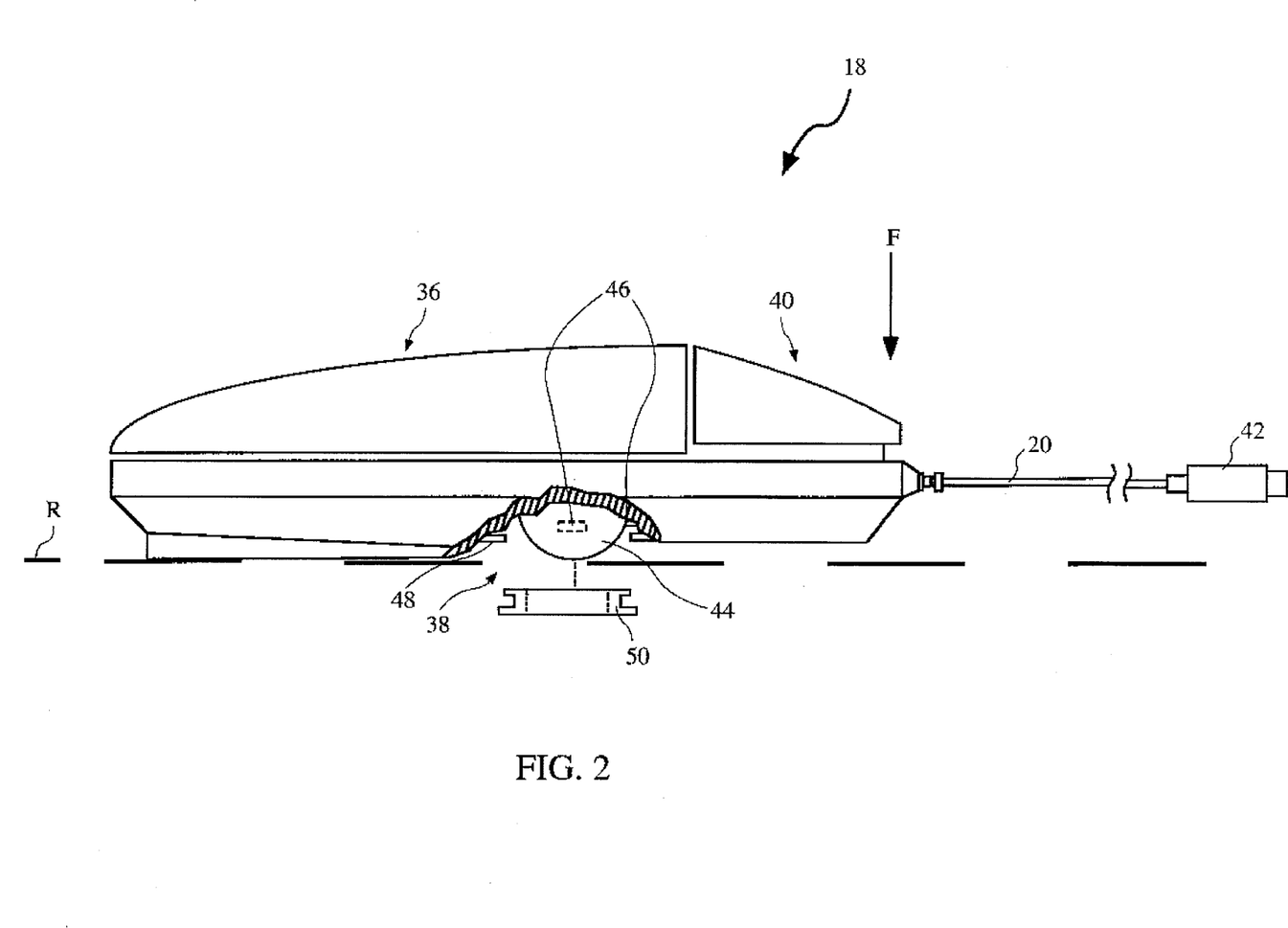
FIG. 2 is a partially broken, partially exploded, side elevational view of multi-state, one-button computer mouse in accordance with the present invention.

In FIG. 2, a multi-state, one-button computer mouse 18 in accordance with the present invention is shown in greater detail. The mouse 18 includes a housing 36 movable over a reference surface R such as the top of table or a mouse pad. A tracking mechanism indicated generally at 38 is coupled to the housing 36 to provide positional coordinates relative to this reference surface R. The computer mouse 18 includes a single button 40 coupled to the housing 36 and movable between a base position, a first button position, and a second button position by a force referred generically to as "F" exerted on the button 40. In the absence of a force F, the button moves to the base position illustrated, i.e. the button is in an "off" position. The cable 20 is coupled at one end to the housing 36 and at the other end to a connector 42 which couples with a mating connector of the keyboard 16.

There are a variety of tracking mechanisms that can be provided for the mouse 18 of the present invention. Such tracking mechanisms are well known to those skilled in the art. The one illustrated includes a ball 44 made from a rubbery material which can roll in an essentially x,y plane along the reference surface R, and a pair of sensor wheels 46 which are frictionally engaged with the ball 44. Output from the sensor wheels 46 are input to circuitry on a PC board 48 were they are translated into coordinate data that is placed on the cable 20 of the mouse 18. The ball 44 is held in place with a collar 50 which locks into the bottom of the housing 36. Of course, alternative tracking mechanisms can be used such as optical tracking mechanisms, can also be employed.

Figure 3A:
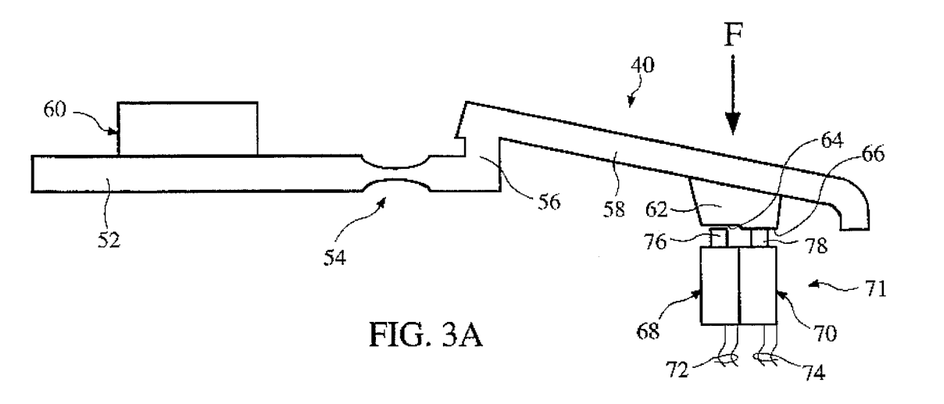
FIGS. 3a, 3b, and 3c illustrate a first embodiment of the computer mouse of FIG. 2.
Figure 3B:
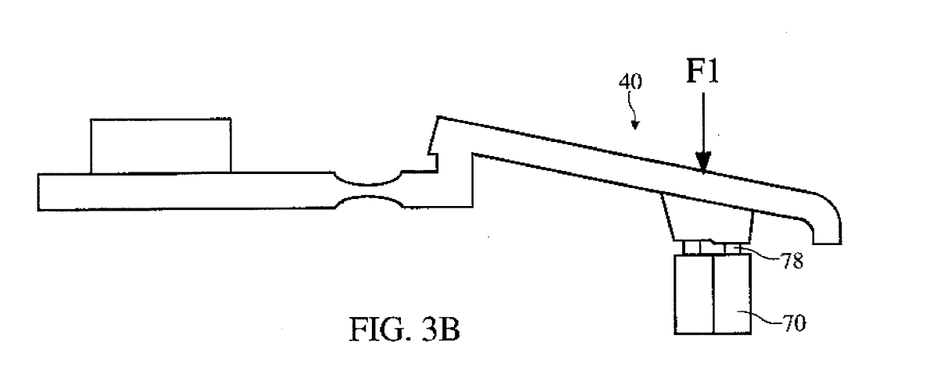
Figure 3C:
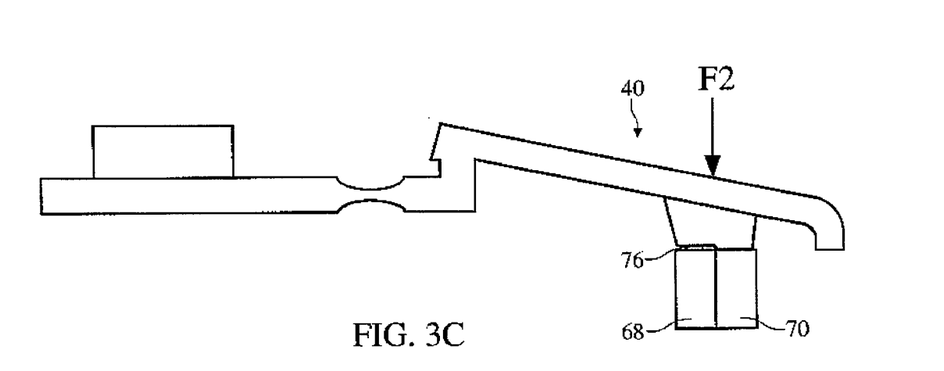

FIGS. 3a, 3b, and 3c illustrate the operation of a first embodiment of the present invention. In this embodiment, the button 40 is an elongated, unitary structure including a base portion 52, a hinge portion 54, an offset portion 56, and a button portion 58. The base portion 52 and hinge portion 54 are located within housing 36, and, thus, are not usually seen by a user of the mouse. The base portion 52 is anchored to the housing 36 by an anchor 60 such that it is, essentially, immovable with respect to housing 36. The button 40 is preferably make from a flexible, elastic, plastic material such as ABS plastic. The hinge 54 (which only about 1/16 of a inch thick) permits the button portion 58 to pivot around the hinge 54 respective to fixed portion 52.

The button 40 is urged to its base position by a combination of an innate springiness in its plastic material, and by the actuator(s) of the switch mechanism. If additional biasing force is needed, a small spring can be provided to urge the button portion 58 to its base (off) position.

In this embodiment, a cam 62 having two cam surfaces 64 and 66 is attached to the bottom of button portion 58 of button 40. The cam surfaces 64 and 66 are in two, separate planes, and are used to activate a pair of micro-switches 68 and 70 respectively at different times. Each of the micro-switches 68 and 70 include a spring-loaded actuator 76 and 78, respectively, which engage the cam surfaces 64 and 66, respectively.

Alternatively, the cam surface can be essentially planar, and the switches could be supported at different heights so that an actuator of a first switch is contacted by the cam surface before an actuator of a second switch is contacted by the cam surface. Collectively, the switches 68 and 70 form a switch mechanism 71. In this preferred embodiment, each of micro-switches 68 and 70 are functionally Single Pole, Single Throw (SPST) switches having a pair of leads 72 and 74 respectively. Of course, other type of switches such as Single Pole, Double Throw (SPDT) switches can be used equally as well.

As seen in FIG. 3a, a force has been applied to button portion 58 of button 40 until the cam surface 66 has just contacted the actuator 78, which will be alternatively referred to herein as the first switch or "SWITCH1." However, at this point, the switch 70 has not been activated. In FIG. 3b, a greater force F1 is provided to overcome a spring biasing force on the actuator 78 to activate the switch 70. Finally, in FIG. 3c a greater force F2 has been provided to overcome the spring biasing force on actuator 76 of switch 68 (which will be alternatively referred to herein as the second switch or SWITCH2) such that both switch 68 and switch 70 are activated.

It should be noted that by "activated" it is meant that a switch has changed state. The switches 68 and 70 can be normally open switches, in which case "activation" would close the switch, or the switches 68 and 70 can be normally closed switches, such that the switch is opened when activated. Alternatively switches 68 and 70 can be of opposite types. Therefore, as used herein, "activated" simply means that the switch is made a detectable change of state.

It should also be noted that the mouse of the present invention does not physically lock the mouse button or either of the switches. That is, both the first switch and the second switch are momentary contact switches that do not "lock" into position. There is also no provision to catch and release the button to perform a physical locking function. The locking button mode is therefore accomplished by a combination of the additional, second switch and specialized computer implemented processes running on the computer system that recognize this second switch.

Figure 4:
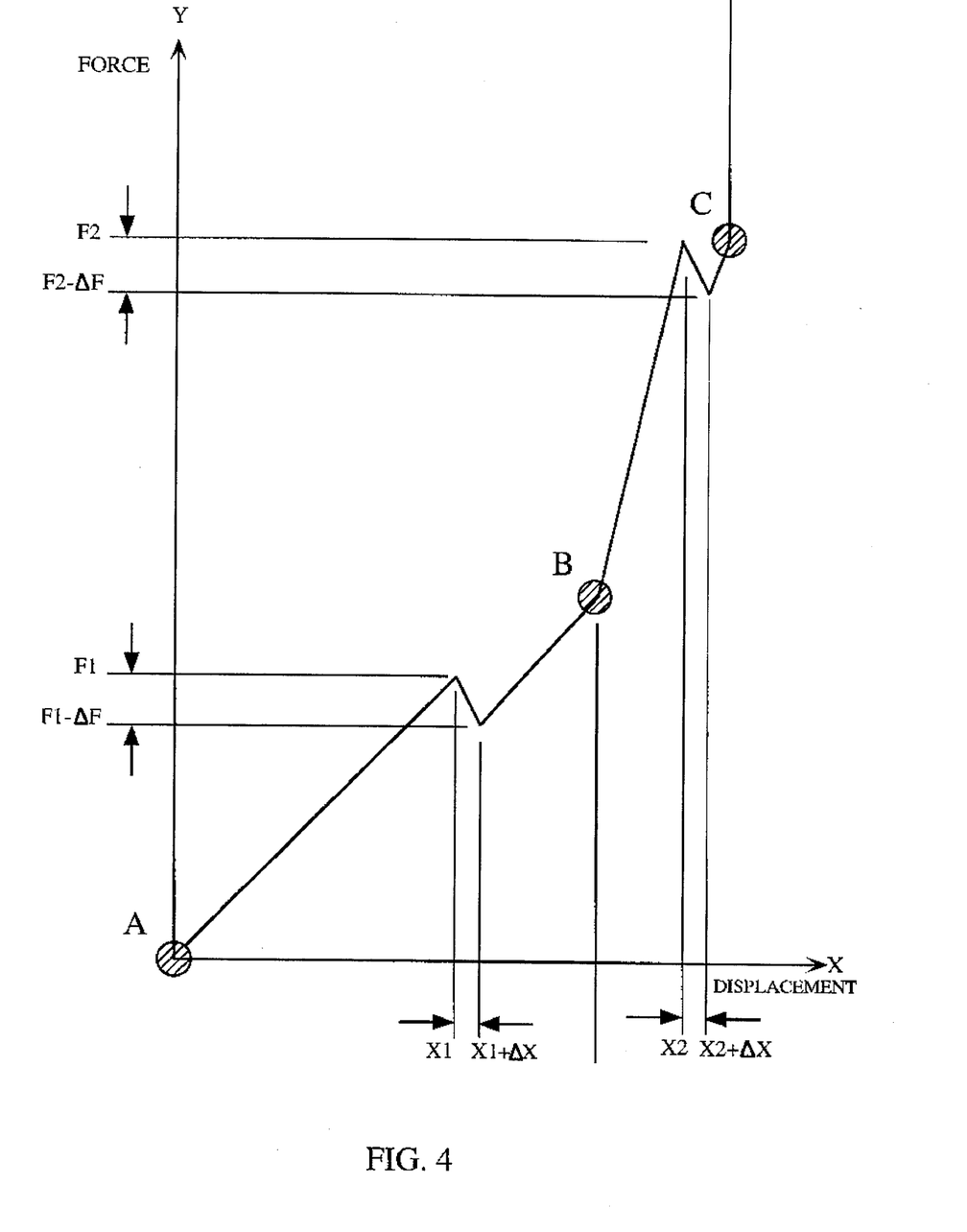
FIG. 4 is graph illustrating the operation of the embodiment of FIGS. 3a, 3b, and 3c.

The operation of the mechanisms illustrated in FIGS. 3a–3c will be discussed in greater detail with reference to FIG. 4. In FIG. 4, the vertical displacement of the button portion 58 can be seen along the X axis, while the required force on the button portion 58 can be seen along the Y axis. At a point A, no force F is being applied to the button portion 58 and the button 40 is in its base position. The force increases to force F1 which moves button portion 58 to a position X1, at which time the first switch 70 is activated. The activation of the switch 70 will cause a tactile drop as the spring force within the switch drops, such that as the button portion is continued to be pressed to a position X1+$\Delta$X the force required becomes F1–$\Delta$F. After this point, the force starts to increase again. When the cam surface 64 contacts the actuator 76 of the second switch 68 at a point B, the force required for given X displacement increases dramatically. When the displacement has reached the position X2 with a force F2 there is another tactile drop due to the functioning of the second switch 68, such that the force required to move to position X2+$\Delta$X is F2–$\Delta$F. Thereafter, at position C, the cam surface 68 has "bottomed out" against the top of the first switch 70 such that no further X displacement is possible (without breaking the switch).

Figure 5A:
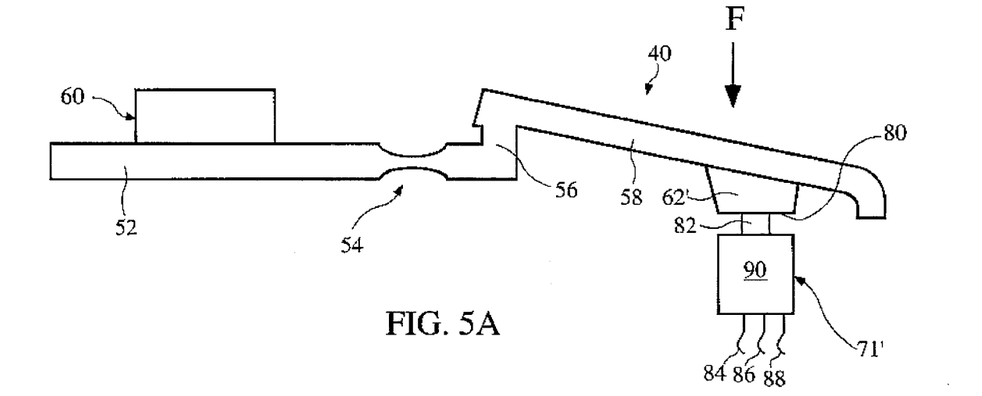
FIGS. 5a, 5b, and 5c illustrate a second embodiment of the computer mouse of FIG. 2.
Figure 5B:
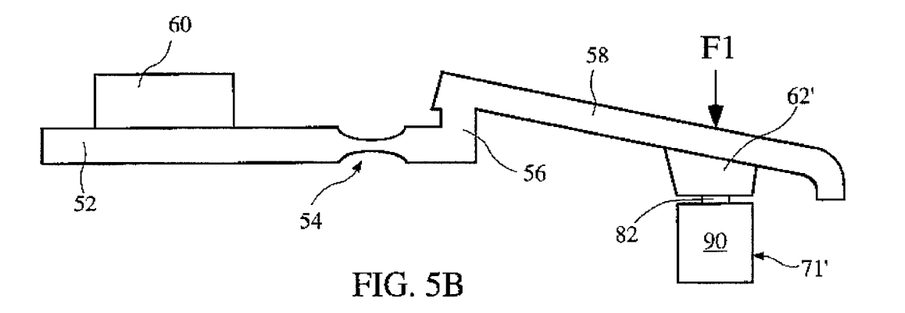
Figure 5C:
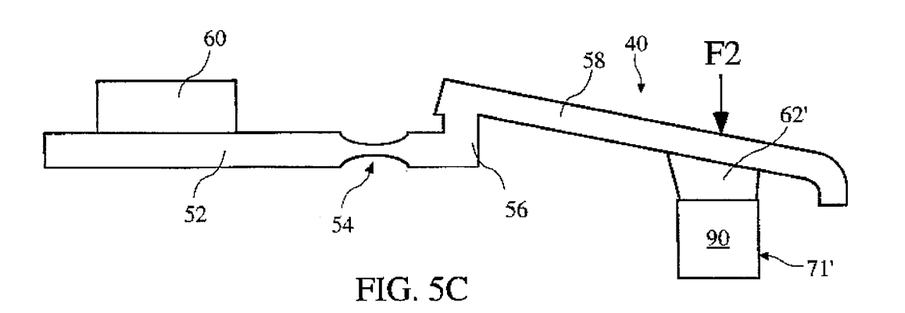

In FIGS. 5a, 5b, 5c, an alternate embodiment of the mouse of FIG. 2 substitutes a cam 62' and switch mechanism 71' for the cam 62 and switch mechanism 71 of the previously described embodiment. More particularly, the cam 62' has a substantially planar bottom surface 80, and the switch mechanism 71' has single actuator 82. This switch mechanism 71' is a preferably a ganged SPDT switch available from such sources as Alps Electric, Inc. With a ganged SPDT switch there is common lead 84, a first switch lead 86, and second switch lead 88. When the actuator 82 has no force applied to it, neither switch is activated. If the actuator 82 is pressed in partially into the housing of the switch mechanism 71', a first switch is activated, and by continuing to press the actuator towards the housing a second switch is activated. Therefore, this ganged switch 71' serves the same function as the two switches 68 and 70 of the embodiments of FIGS. 3a, 3b, and 3c.

In FIG. 5a, enough force F has been applied to the button portion 58 so that the bottom surface 80 of cam 62' has just contacted the top of the actuator 82. With a continuing force of F1, the actuator 82 is partially forced to into housing 90 of switch 71' to activate a first switch, as seen in FIG. 5b. As seen FIG. 5c, the continuing force of F2 will force the actuator 82 further into the body 90 of switch 71', to activate both the first switch (SWITCH1) and the second switch (SWITCH2).

The mechanisms as described previously are, in this preferred embodiment, used to provide additional mouse data (i.e. SWITCH2 data) to the computer system 10. While this additional data can be used for a number of functions, the preferred use of the additional data provided by SWITCH2 is to indicate a locked button state for the mouse 18. To this end, the first switch is used as a normal mouse button switch to indicate to "click" of the mouse button. The second switch then is used to indicate that the mouse is in a locked button state. However, the use of the additional mouse data is purely under software control, such that the SWITCH2 data could, for example, be programmed to emulate a double-click of SWITCH1, or for other user-definable purposes.

Figure 6A:
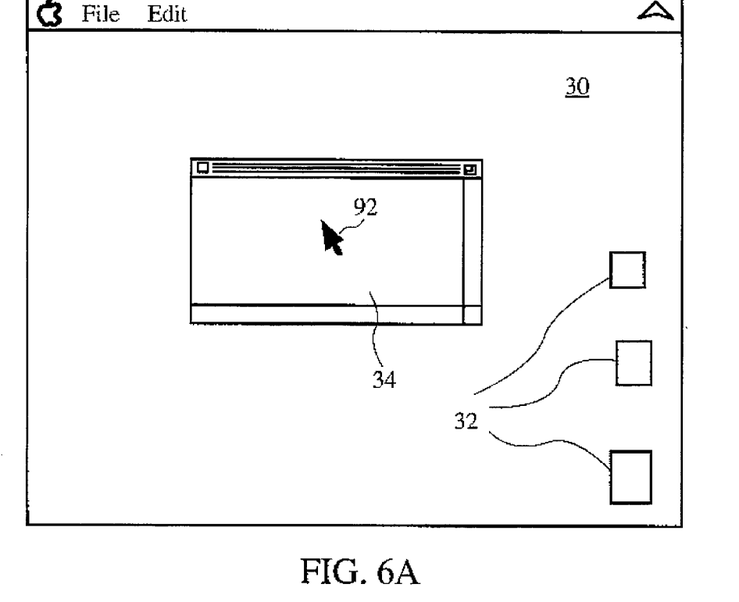
FIGS. 6a and 6b illustrate a cursor in a normal button mode and in a locked button mode, respectively.
Figure 6B:
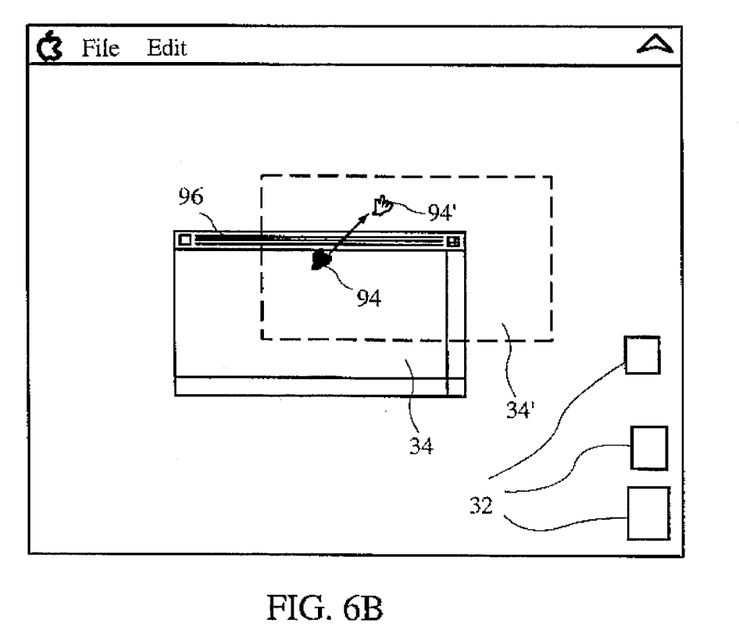

The present invention includes a computer implemented process for indicating when the mouse button is in normal state, and when it is in a locked state. For example, in FIG. 6a, an arrow cursor 92 is positioned over a window 34. This arrow cursor 92 has been chosen to indicate an unlocked mouse button. In contrast, in FIG. 6b, a "fist" cursor 94 is shown. This fist cursor preferably appears to be a closed hand with the index finger extended. The fist cursor 94 indicates that the mouse button is a locked mode so that the user has immediate, visual feedback about which mode the mouse button is in. As mentioned previously, it is considered important to this invention to provide such a visual feedback so that the ambiguities and uncertainties of prior art locked buttons are not present one-button mouse of the present invention. If the fist cursor 74 is engaged with a drag bar 96 of window 34, the window can be dragged to a new position 34' by moving the mouse 18 such that the cursor 94 moves to a new position 94'. This can be accomplished without the user providing any force on the button 40, i.e. the button can be completely released. Thus, by providing this locked button feature, the functionality of a one-button mouse is increased.

The process of the present invention is preferably implemented on a Macintosh computer system using a mouse as described herein. In a Macintosh computer system, mouse data is detected by the operating system and put into an event queue. The data is then handled by a piece of software known as a mouse data handler. Cursor images are under the control of application programs and the finder, and handled by a piece of software known as cursor setting procedure. The operation of the normal mouse data handler and the normal cursor setting procedure are well known to those skilled in the art, and are described in published literature, such as the *Inside Macintosh* series of publications.

The process of the present invention is implemented by providing a pair of software "patches." A first software patch intercepts new mouse data before passing it on to the normal mouse data handler. A second software patch intercepts requests for cursor setting procedure, pre-processes the request, and then passes the request to the normal cursor setting procedure.

It should be understood that the process as described herein has been implement on and is optimized for a Macintosh operating system. However, similar functionality can be provided on other types of computer systems, including IBM PC-compatible computer systems and other types of personal computer systems, workstations such those made by Sun Microsystems, Hewlett Packard, etc. and a variety of other types of computer systems. Therefore, the following description is intended to be taken in the way of an example for a particular computer platform, and is not intended to be limited to use only on Macintosh computer systems.

By providing two switches a the one-button mouse, several "states" must be dealt with. As used herein, the term "states" will refer to the various mouse states, e.g. whether the mouse in a normal mouse mode, is in the process of being in a locked button mode, or is in a locked button mode with the button fully released. The software patch which pre-processes the mouse data must keep track of these states to properly pre-process the data.

With the forgoing understanding, state zero is defined as the mouse button as being in the unlocked position, state one is mouse the locked position and where either SWITCH1 or SWITCH2 is still activated, and state two shall be the state in which the button is in the locked position but where neither SWITCH1 or SWITCH2 are activated. It will be understood that, as far as the normal mouse data handler is concerned, SWITCH1 and SWITCH2 are data, and may not correspond to the actual state of the physical switch in the mouse. This is because the software patch as described subsequently, may "fool" the mouse data handler into thinking, for example, that SWITCH1 is closed, even if the physical switch is not, thereby implementing the locked button function.

Figure 7:
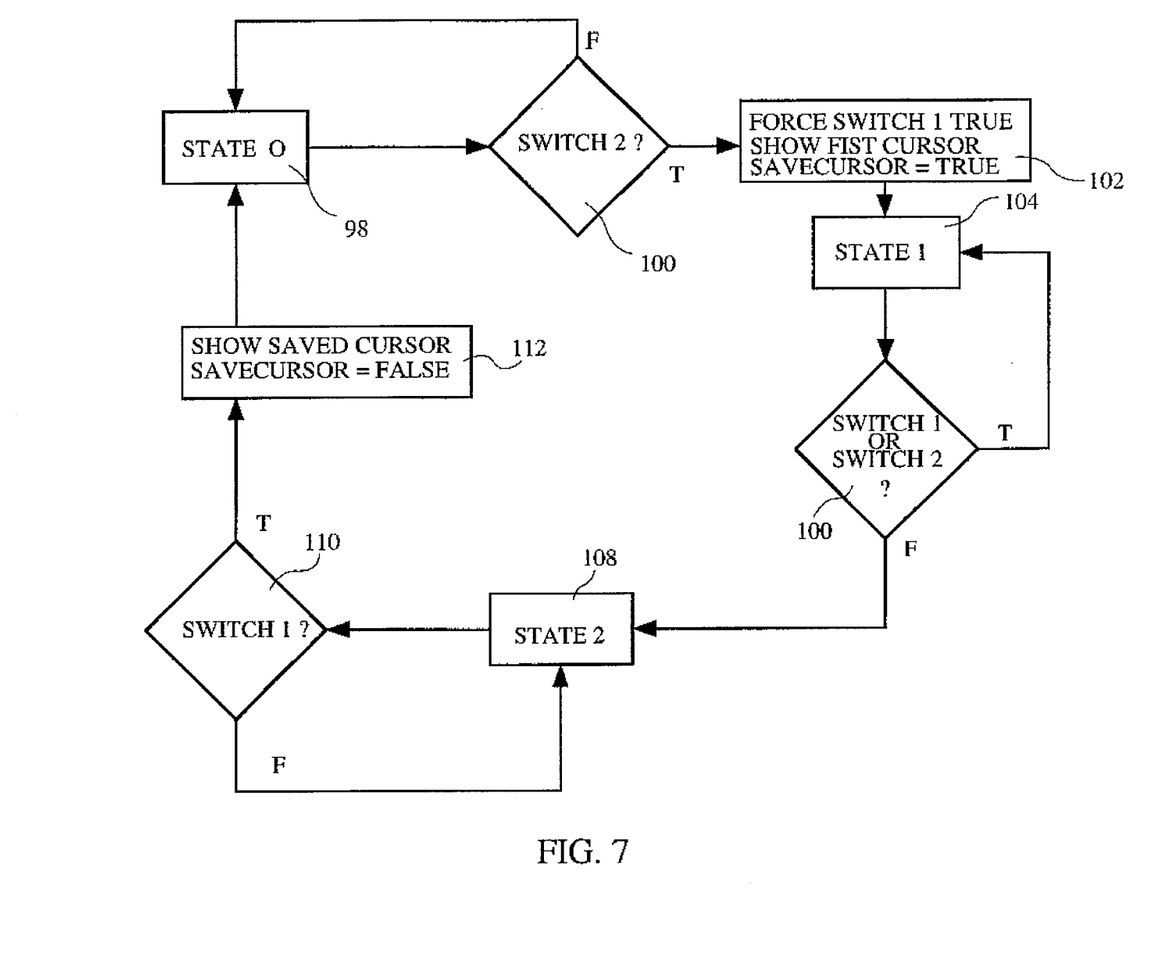
FIG. 7 is state diagram illustrating a computer implemented process of the present invention.

In FIG. 7, a state diagram is illustrated as one way of describing of the software patch processes of the present invention. Assume that the computer is in state zero as shown at 98. The computer will remain in state zero until SWITCH2 is true as shown at 100. If SWITCH2 is true, the data corresponding to SWITCH1 is forced to TRUE, and a flag SAVECURSOR is set to TRUE at 102. This will provide a fist cursor upon the next call by the application program for a cursor image. The computer is then in state one as indicated at 104. The computer system will stay in state 104 as indicated as long as either SWITCH1 or SWITCH2 are true as indicated at 106. When both SWITCH1 and SWITCH2 are false, the machine then enters state two, as indicated 108 were it will remain until SWITCH1 is true as indicated at 110. When SWITCH1 is true, the user is canceling the locked button mode, and the normal cursor stored in SAVEDCURSOR is displayed. Also and the flag SAVECURSOR is set to false, as indicated at 112. The system is then back in state zero, where the process may be repeated.

As will appreciated by the state diagram of FIG. 7 the mouse button enters the locked mode by pressing the button 40 until SWITCH2 is activated. The mouse button will remain in the locked button mode even after the release of the button until SWITCH1 is activated at some time in the future.

Figure 8:
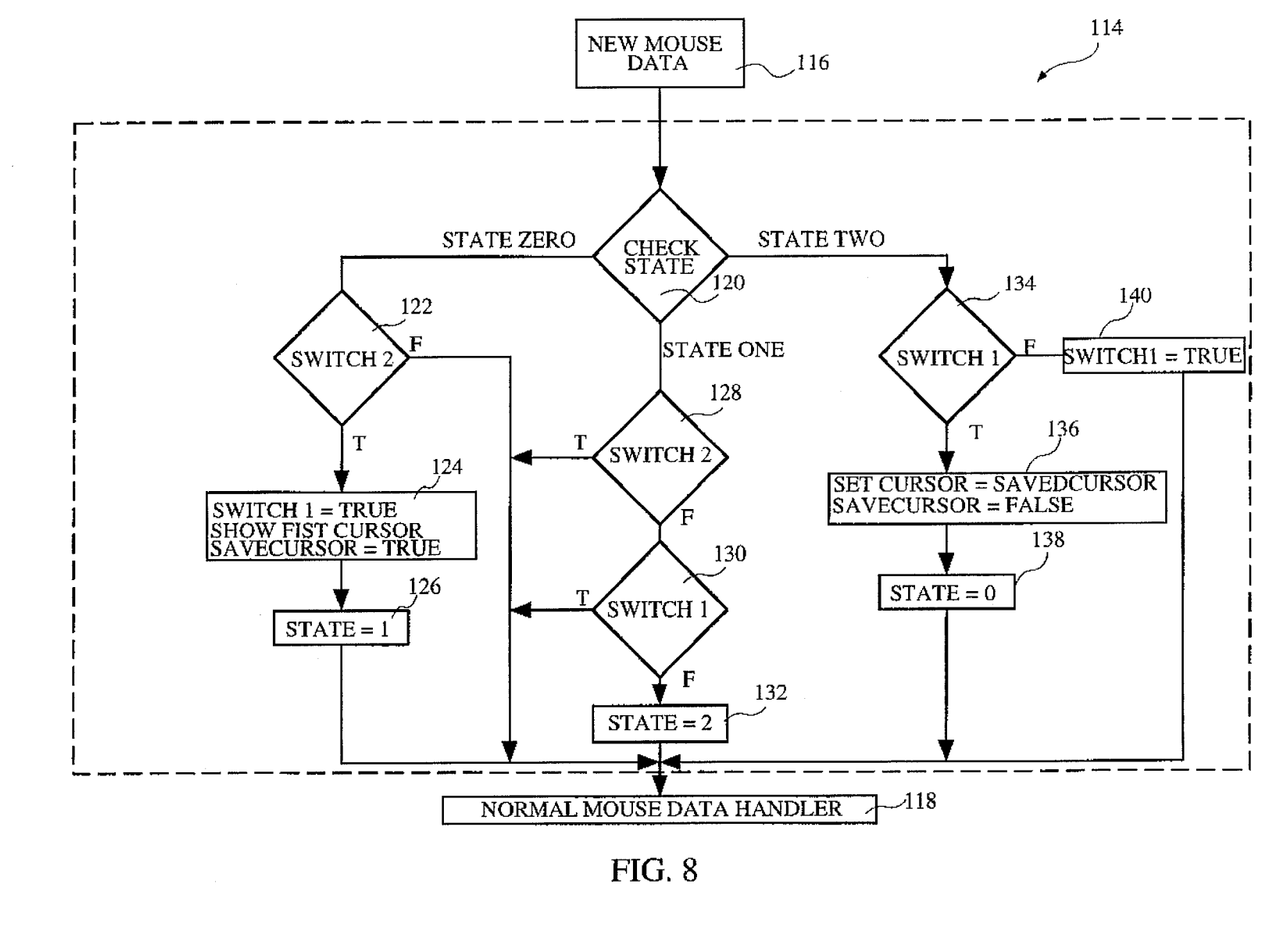
FIG. 8 is flow diagram illustrating a mouse data handler patch of the present invention.

In FIG. 8, a mouse data handler patch 114 is shown intercepting new mouse data 116 before passing on data to the normal data handler 118. In a decision step 120, the process 114 checks the current state. If the state is state zero, a decision step 122 determines whether SWITCH2 has been activated. If it has, a step 124 sets SWITCH1 to TRUE, and sets the flag SAVECURSOR to TRUE, thereby allowing the fist cursor to be displayed. Next, in a step 126, the state is set to state one. Process control is returned to the normal mouse data handler 118 of the Macintosh operating system after either the determination of step of 122 that SWITCH2 in not activated or after the completion of step 126.

If the decision step 120 determines that the state is state one, SWITCH2 is checked in a step 128 and, subsequently, SWITCH1 is checked in a step 130. If either SWITCH2 or SWITCH1 are activated, process control is returned directly to the normal mouse data handler 118. If neither SWITCH2 nor SWITCH1 are activated, a step 132 sets the state to state two, after which time process control is returned to normal mouse data handler 118.

If the decision step 120 determines the state is state two, a decision step 134 determines whether SWITCH1 is activated. If it is, a step 136 sets a variable SAVEDCURSOR to the cursor that is to be saved, and the flag SAVECURSOR is set to FALSE. Next, a step 138 sets the state to state zero, and process control is returned to the normal mouse data handler 118. If the detect step 134 determines the SWITCH1 is not activated, SWITCH1 is forced to TRUE and process control is returned to the normal mouser data handler 118.

The operation of the process 114 is completely transparent to the normal mouse data handler 118. Therefore, the normal mouse data handler believes that it is dealing with a standard Macintosh one-button mouse. The process 114 preprocesses the mouse data to make sure that the normal mouse data handler gets the right type of information to implement the locked button mode. If the computer system is in state zero, the mouse button is in the unlocked button state and, unless SWITCH2 is pressed, the data is simply is passed on to the normal mouse data handler. If SWITCH2 is pressed while in state zero, the process 114 modifies the data such that the normal mouse data handler thinks that SWITCH1 has been pressed. When in state one, the button is still in the locked position and, therefore, SWITCH1 is still set to be true and the normal mouse data handler believes that the first switch is still activated. When the computer system is state two, until the SWITCH1 is again activated the mouse data handler is told that SWITCH1 is true, causing the creation of the illusion of a locking button. Therefore, as can be seen, the process 114 makes the operation of the locked button mode completely transparent to the normal system operation of the computer system.

Figure 9:
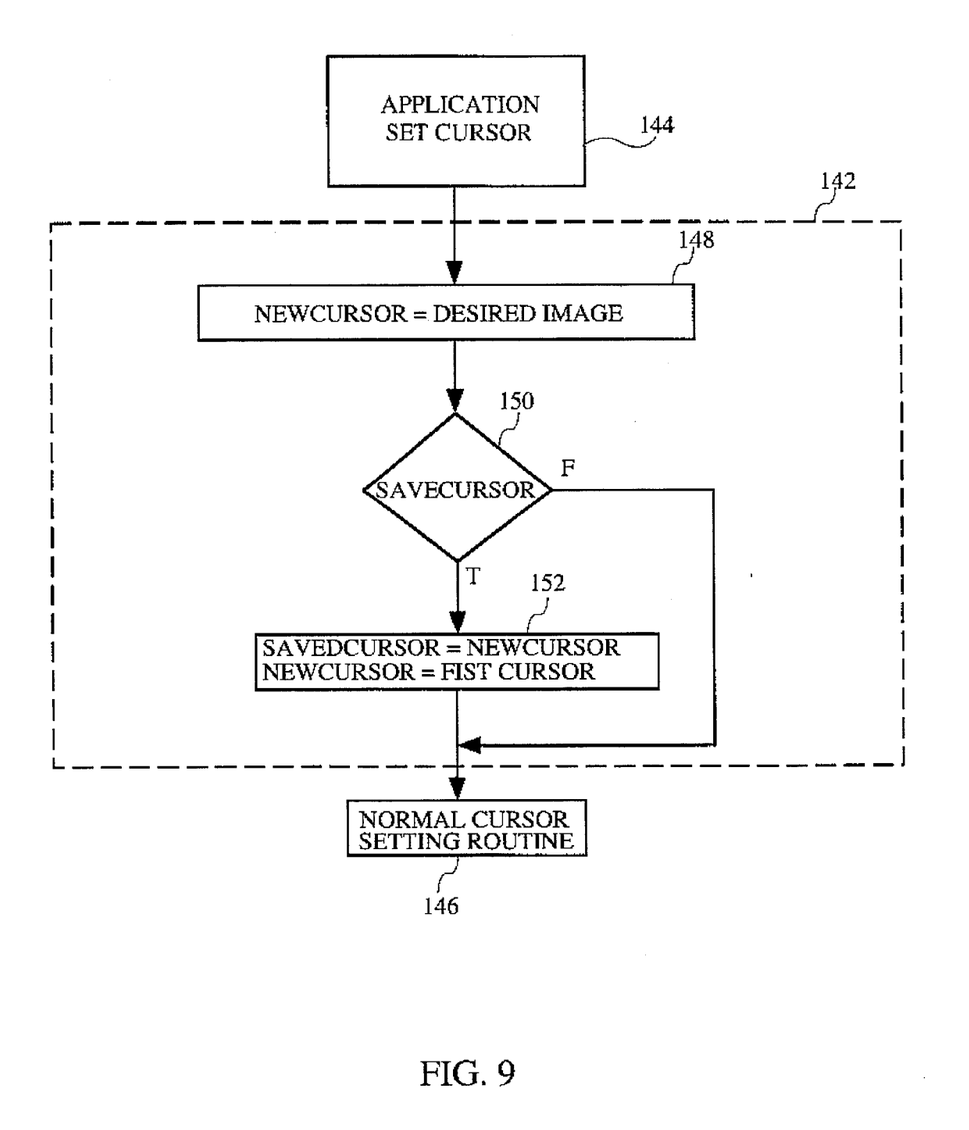
FIG. 9 is a flow diagram illustrating a cursor setting routine patch in accordance with the present invention.

In FIG. 9, a software patch 142 is provided to intercept "set cursor" calls 144 from a application program (or the finder) before they reach the normal cursor setting routine 146 provided by the Macintosh operating system. The patch 142 sets a variable NEWCURSOR to a desired image in a step 148, and tests the flag SAVECURSOR in a decision step 150. If SAVECURSOR is true, a step 152 saves the NEWCURSOR in the variable SAVECURSOR and assigns the fist cursor (as described previously) to the variable NEWCURSOR. If SAVECURSOR is false, the step 152 is bypassed. This small software patch 142 therefore has the effect of substituting the fist cursor for the normal cursor ("desired image") before sending it to the normal cursor setting routine for display on the computer screen 30. If SAVECURSOR is false, the desired image (such as the arrow cursor 92) is displayed, as normal.

While this invention has been described in terms of several preferred embodiments, it is contemplated that alternatives, modifications, permutations and equivalents thereof will become apparent to those skilled in the art upon a reading of the specification and study of the drawings. For example, which this invention has been primarily described in terms of a mouse, its functionality can be implemented in a variety of pointing systems that implement both a click and a locked button function on a single button. It is, for example, entirely applicable to trackballs, which are basically up-side-down mice. It is therefore intended that the following appended claims include all such alternatives, modifications, permutations and equivalents as fall within the true spirit and scope of the present invention.

What is claimed is:

1. A computer pointing device with multiple states on a button comprising:

a housing;

a tracking mechanism coupled to said housing to provide positional coordinates in a reference surface;

a button movable between a base position, a first button position, and a second button position by a force exerted on said button, said button being biased to said base position in the absence of said force; and a switch mechanism coupled to said button, said switch mechanism activating a first switch at said first button position and a second switch at said second button position.

2. A computer pointing device as recited in claim 1 wherein said switch mechanism is coupled to said button by a cam.

3. A computer pointing device as recited in claim 2 wherein said cam has two cam surfaces, disposed in two, separate planes, and wherein said switch mechanism includes two switches, one of which is activated by a first cam surface and the other of which is activated by a second cam surface.

4. A computer pointing device as recited in claim 1 wherein said switch mechanism is a ganged switch.

5. A computer pointing device as recited in claim 1 wherein said button is of integral construction and includes a fixed portion and a button portion coupled together by a hinge portion.

6. A multi-state one-button computer mouse comprising:

a housing movable over a reference surface;

a tracking mechanism coupled to said housing to provide positional coordinates relative to said reference surface;

a single button movable between a base position, a first button position, and a second button position by a force exerted on said button, said button being biased to said base position in the absence of said force; and a switch mechanism coupled to said button, said switch mechanism activating a first switch at said first button position and a second switch at said second button position.

7. A multi-state one-button computer mouse as recited in claim 6 wherein said switch mechanism is coupled to said button by a cam.

8. A multi-state one-button computer mouse as recited in claim 7 wherein said cam has two cam surfaces, disposed in two, separate planes, and wherein said switch mechanism includes two switches, one of which is activated by a first cam surface and the other of which is activated by a second cam surface.

9. A multi-state one-button computer mouse as recited in claim 6 wherein said switch mechanism is a ganged switch.

10. A multi-state one-button computer mouse as recited in claim 6 wherein said button is of integral construction and includes a fixed portion and a button portion coupled together by a hinge portion.

11. A computer system with pointing device comprising:

a computer system including a processing unit and a visual display;

a pointing device coupled to said processing unit, said pointing device including:

a housing;

a tracking mechanism coupled to said housing to provide positional coordinates in a reference surface to said processing unit;

a button being movable between a base position, a first button position, and a second button position by a force exerted on said button, said button being biased to said base position in the absence of said force; and a switch mechanism coupled to said button, said switch mechanism activating a first switch at said first button position and activating a second switch at said second button position; and means for indicating on said visual display when said second switch has been closed.

12. A computer system as recited in claim 11 wherein said means for indicating is a computer implemented process running on said processing unit.

13. A computer system as recited in claim 12 wherein said computer implemented process provides a locking button mode cursor after said second switch has been closed.

14. A method for processing switch inputs to a computer system comprising:

(a) entering a known state comprising one of a zero state, a one state, and a two state;

(b) detecting at least two button positions of a button with a switch mechanism, said switch mechanism activating a first switch at a first button position and activating a second switch at a second button position; and (c) if in said zero state, entering said one state if said second switch is activated, if in said one state entering said two state if neither the first switch nor the second switch are activated, and if said two state entering said zero state if said first switch is activated, where said one state indicates a non-locked position of said button and said one state and said two state indicate a locked position of said button.

15. A method as recited in claim 14 further comprising the step of:

(d) repeating steps (b) and (c).

16. A method as recited in claim 15 wherein said step of entering said one state from said zero state further comprises:

displaying a locked cursor on said visual display to indicate that said button is locked.

17. A method as recited in claim 15 wherein said step of entering said zero state from said two state further comprises:

displaying a normal cursor on said visual display to indicate that said button is not locked.

18. A computer-implemented process for processing pointer data comprising:

intercepting pointer data entered into processing unit of a computer system;

determining in said processing unit if said pointer data includes locked button data and entering a locked button state if said pointer data includes said locked button data;

processing said pointer data in a pointer data handler in said processing unit; and changing a cursor image to be displayed on a visual display coupled to said processing unit to indicate said locked button state.

19. A computer implemented process as recited in claim 18 wherein said pointer data is mouse data including data from a first switch and a second switch associated with a single button, and wherein said locked button data includes data from said second switch.

20. A computer implemented process as recited in claim 19 wherein said cursor image indicating a locked button state is an image of a hand with a forefinger extended.

* * * * *